us005764749a

United States Patent [19]
Zelazny et al.

[11] Patent Number: 5,764,749
[45] Date of Patent: Jun. 9, 1998

[54] CARRIER DIRECT CALLING

[75] Inventors: Michele Zelazny, Mt. Kisco, N.Y.; Karen A. McInerney, Norwalk, Conn.; Sergio Wernikoff, Woodcliff Lakes, N.J.; Bruce A. Willey, Riverside, Conn.

[73] Assignee: MCI Corporation, Washington, D.C.

[21] Appl. No.: 672,140

[22] Filed: Jun. 27, 1996

[51] Int. Cl.$^6$ ................................................. H04M 7/00
[52] U.S. Cl. ....................... 379/220; 379/115; 379/201; 379/207; 379/249
[58] Field of Search ........................ 379/219, 220, 379/221, 112, 113, 114, 115, 201, 207, 211, 212, 216, 127, 289, 355

[56] References Cited

U.S. PATENT DOCUMENTS

| | | | |
|---|---|---|---|
| 4,555,594 | 11/1985 | Friedes et al. | 379/220 |
| 4,565,903 | 1/1986 | Riley | 379/220 |
| 4,577,066 | 3/1986 | Bimonte et al. | 379/221 |
| 4,754,479 | 6/1988 | Bicknell et al. | 379/207 |
| 4,791,665 | 12/1988 | Bogart et al. | 379/207 |
| 4,866,763 | 9/1989 | Cooper et al. | 379/221 |
| 5,222,125 | 6/1993 | Creswell et al. | 379/67 |
| 5,237,604 | 8/1993 | Ryan | 379/220 |
| 5,272,749 | 12/1993 | Masek | 379/216 |
| 5,333,184 | 7/1994 | Doherty et al. | 379/115 |
| 5,333,185 | 7/1994 | Burke et al. | 379/127 |
| 5,475,749 | 12/1995 | Akinpelu et al. | 379/221 |
| 5,479,494 | 12/1995 | Clitherow | 379/144 |
| 5,550,909 | 8/1996 | Chanda et al. | 379/220 |
| 5,550,910 | 8/1996 | DeJager | 379/220 |
| 5,550,912 | 8/1996 | Akinpelu et al. | 379/221 |
| 5,583,926 | 12/1996 | Venier et al. | 379/207 |
| 5,598,464 | 1/1997 | Hess et al. | 379/213 |
| 5,602,909 | 2/1997 | Carkner et al. | 379/207 |
| 5,610,977 | 3/1997 | Williams et al. | 379/207 |
| 5,625,681 | 4/1997 | Butler, II | 379/207 |
| 5,661,792 | 8/1997 | Akinpelu et al. | 379/221 |

*Primary Examiner*—Krista Zele
*Assistant Examiner*—Scott Wolinsky

[57] ABSTRACT

The processing of telephone calls is described herein. A telephone call is initiated over a public telephone line using a carrier direct telephone number having a carrier specific identifier. The carrier specific identifier designates the international carrier that has assigned the carrier direct number (Carrier Direct Service Provider). The telephone call is routed to an international carrier in the country of origin. That international carrier recognizes the carrier specific identifier and routes the call to the Carrier Direct Service Provider. The Carrier Direct Service Provider translates the carrier direct telephone number to a public telephone number. The call is then routed over public telephone lines in accordance with the public telephone number.

6 Claims, 6 Drawing Sheets

FIG. 4

| INPUT TELEPHONE NUMBER | OUTPUT TELEPHONE NUMBER | |
|---|---|---|
| 150-123-4567 | 202-888-8000 (COMPANY-SPECIFIC (COMPANY A'S (DDD) NUMBER) | 452 |
| 150-203-1212 | 203-555-1212 (GENERAL (CONNECTICUT DIRECTORY ASSISTANCE) INFORMATION DDD NUMBER) | 454 |
| 150-800-1040 | 800-829-1040 (GENERAL IRS (FEDERAL INCOME TAX) INFORMATION 800 NUMBER) | 456 |
| 150-974-6666 | 800-974-6660 (COMPANY-SPECIFIC (COMPANY A'S) 800 NUMBER) | 458 |
| 150-666-6000 | 617-666-6000 (COMPANY-SPECIFIC (COMPANY A'S) PRIVATE NETWORK NUMBER) | 460 |

CARRIER DIRECT CALLING

BACKGROUND OF THE INVENTION

1. Field of the Invention

The present invention is directed to a telecommunications network, and in particular, to a system and method for processing international telephone calls.

2. Related Art

An International Virtual Private Network (IVPN) provides a customized dialing plan for some or all of a company's overseas telephone calls. The company (called the subscribing company for reference purposes) is typically a multinational corporation that wants connectivity among its many offices and subsidiaries in multiple countries.

The customized (and/or abbreviated) numbers (also called private numbers) are typically selected by the subscribing company and can vary in length by customer and or service/ network provider. The IVPN service/network provider converts the customized numbers into Public Switched Telephone Network (PSTN) addresses (off-net), or to the private number that is listed in another IVPN carrier's dialing plan for that customer (on-net).

The conventional method of processing a call within an IVPN has the calling party dialing a public or private number that is within the dialing plan associated with the subscribing company. The calling party is at a site of the subscribing company in one country and the called party is in another country. The call is routed by the originating service provider to the other country either as a IVPN on-net or IVPN off-net call. Off-net IVPN calls are transported across national boundaries using a PSTN address, and are typically routed like any other International Direct Distance Dialed (IDDD) call (described in further detail below). On-net IVPN calls are typically transported across national boundaries using a customer specific private number that the subscribing customer has identified. The originating service provider transfers the call through one or more switches to deliver the IVPN on-net call to the terminating service provider. The terminating service provider translates the private number to a standard PSTN address or to a private network address and routes the call through one or more switches to the customer location or delivers the call to a local network provider for completion.

A limitation of a conventional IVPN is that it is a closed (private) environment. The calling party must be an IVPN subscriber. That is, the originating phone must be subscribed to an IVPN service. In the case of calling card and remote access, the user must be subscribed to an IVPN service. Therefore, the general public is excluded from the customized dialing plans and special rates that are characteristic of IVPN services. Moreover, the IVPN telephone numbers are customer specific and not distributed to the general public.

The above description and limitations apply equally well to domestic virtual private networks (VPN). International direct distance dialing (or IDDD) is the mechanism by which most public telephone service is provided between countries. In order to place an IDDD call, a caller dials a number that typically prefixes a national number with both an international access code and country code. In some countries, a code to identify the originating carrier is required. The overseas carrier screens the three digits following the country code to determine which calls should be routed to the U.S. The overseas carrier routes the call proportionally among the U.S. based international carriers. The selected U.S. based international carrier routes the call to a local network for completion.

A limitation of conventional IDDD service is that it has a complex numbering structure. The result is that conventional IDDD is cumbersome and has limited directory assistance across national boundaries. This is because an IDDD PSTN address can vary in length from seven to fifteen digits (excluding international access code and/or carrier identification digits).

For example, if the call is from London, England to a telephone number in Westchester, N.Y., the number dialed in London would be 010-1-914-9342222. The three-digit access code (010) designates that the call is an international call. The one-digit country code (1) indicates that the call is to be terminated within World Zone 1 (U.S., Canada, Caribbean).

World Zone 1 numbers typically include the following elements: (1) the three-digit area code (914); (2) the three-digit exchange code (934), which indicates the local exchange carrier that must route the call to the subscriber; and (3) the four-digit subscriber number (2222), which indicates the individual party to whom the call is directed.

Wide Area Telephone Service (or WATS) is a service provided to businesses allowing subscribers to make or receive calls and to have them billed at bulk rates. Incoming WATS calls allow the calling party to reach a business, residence, public service, etc. where the subscribing company rather than the calling party pays for the call. Incoming WATS calls are identified in the U.S. by an 8XX area code. That is, the term 8XX refers to "subscriber 800 calls," and includes other sequences of numbers that the Federal Communications Commission deems, or may deem in the future the equivalent of subscriber 800 numbers, such as numbers with an "888" code.

An 8XX subscribing company establishes Incoming WATS service by contracting with one or more carriers. When a calling party dials an 8XX number, the local exchange carrier (LEC) will perform a database lookup to determine the carrier that the subscribing company has indicated should handle the call (subscribing carrier). The subscribing carrier translates the dialed number to a standard PSTN or private network address and routes the call accordingly.

One limitation of 8XX service is that when a caller overseas wishes to reach an 8XX subscribing customer in the U.S. the calling party often has difficulty identifying the appropriate number to dial. Consequently, the overseas caller has difficulty completing the call. Moreover, from some countries it is not possible to dial and complete U.S. 8XX numbers.

What is needed, therefore, is a telephone call processing mechanism that operates in an open environment (no pre-subscription requirements) and provides the calling party an easy to remember phone number to reach frequently dialed numbers in another country.

SUMMARY OF THE INVENTION

Briefly stated, the present invention is directed to a system and method for processing telephone calls. According to the invention, a caller initiates a call over a public telephone line using a carrier direct telephone number. The carrier direct number includes a carrier specific identifier to designate an international carrier in another country (Carrier Direct Service Provider).

The telephone call is routed to the carrier. The Carrier Direct Service Provider translates the carrier direct telephone number to a public telephone number, routes the telephone call over public telephone lines in accordance with the public telephone number.

The invention identifies a plurality of public telephone numbers of interest, assigns carrier direct telephone numbers to the public telephone numbers of interest, generates a translation table which translates from the carrier direct telephone numbers to the public telephone numbers of interest, and publicly distributes the carrier direct telephone numbers in a directory.

One feature of the present invention is the translations table. Using the translation table, the invention provides an easy to use method for reaching telephone numbers of interest. That is, the table allows the Carrier Direct Service Provider to perform translations on a real time, call by call basis from the carrier direct telephone number dialed by the customer to public numbers of interest.

Further features and advantages of the invention, as well as the structure and operation of various embodiments of the invention, are described in detail below with reference to the accompanying drawings.

BRIEF DESCRIPTION OF THE FIGURES

The invention is best understood by reference to the figures wherein references with like reference numbers indicate identical or functionally similar elements. The elements within the figures are functional entities and may or may not be separate physical entities. In addition, the left-most digits refer to the figure in which the reference first appears in the accompanying drawings in which:

FIG. 4 is a diagram illustrating the translation table process;

DETAILED DESCRIPTION OF THE PREFERRED EMBODIMENTS

Overview of the Invention

The present invention is directed to a system and method for processing telephone calls so that numbers of public interest such as International Direct Distance Dialing (IDDD) and Incoming WATS (i.e., 8XX in the U.S.) can be easily accessed from another country.

As used herein, the term "public telephone number" is any telephone number that can be accessed by any member of the public via telephones connected to a public telephone network. Public telephone numbers include direct distance dialing (DDD) numbers, "subscriber 800 numbers," which includes other sequences of numbers that the Federal Communications Commission deems, or may deem in the future the equivalent of subscriber 800 numbers, such as 8XX numbers, international direct distance dialing (IDDD) numbers, etc. A public telephone number may or may not be located in the U.S. A public telephone number within the U.S. is a ten digit number having: (1) a three-digit area code; (2) a three-digit exchange code (or central office code); and (3) a four-digit subscriber number. Generally, 8XX telephone numbers allow a calling party located in the United States to reach a specific U.S. public telephone number free of charge.

The term "public telephone network" refers to a telephone network that can be accessed by any member of the public. Examples of public telephone networks include public long distance networks associated with domestic interexchange carriers (IXC), such as MCI, Sprint, and AT&T. Public telephone networks include "public telephone lines."

As used herein, the term "private telephone number" is a telephone number that can be accessed only via telephones connected to a private telephone network or virtual private network. The term "private telephone network" refers to a telephone network that is not accessible by the general public.

A subscribing company establishes a private telephone network by contracting with a carrier/service provider. Generally, the private telephone numbers associated with a private network are defined by the subscribing company, not the service provider. Examples of private telephone networks include international virtual private networks (IVPN) and virtual private networks (VPN).

For illustrative purposes, the present invention is sometimes described in the context of a method performed by a U.S. based domestic interexchange carrier and an overseas carrier. It should be understood, however, that the present invention is not limited to this embodiment. Instead, the present invention can be performed by any service provider. For example, the present invention can be performed by a cable television company, a natural gas provider, an electric service provider, a wireless service provider, or a satellite-based service provider. The invention is also applicable to domestically telephone service.

Figure 1:
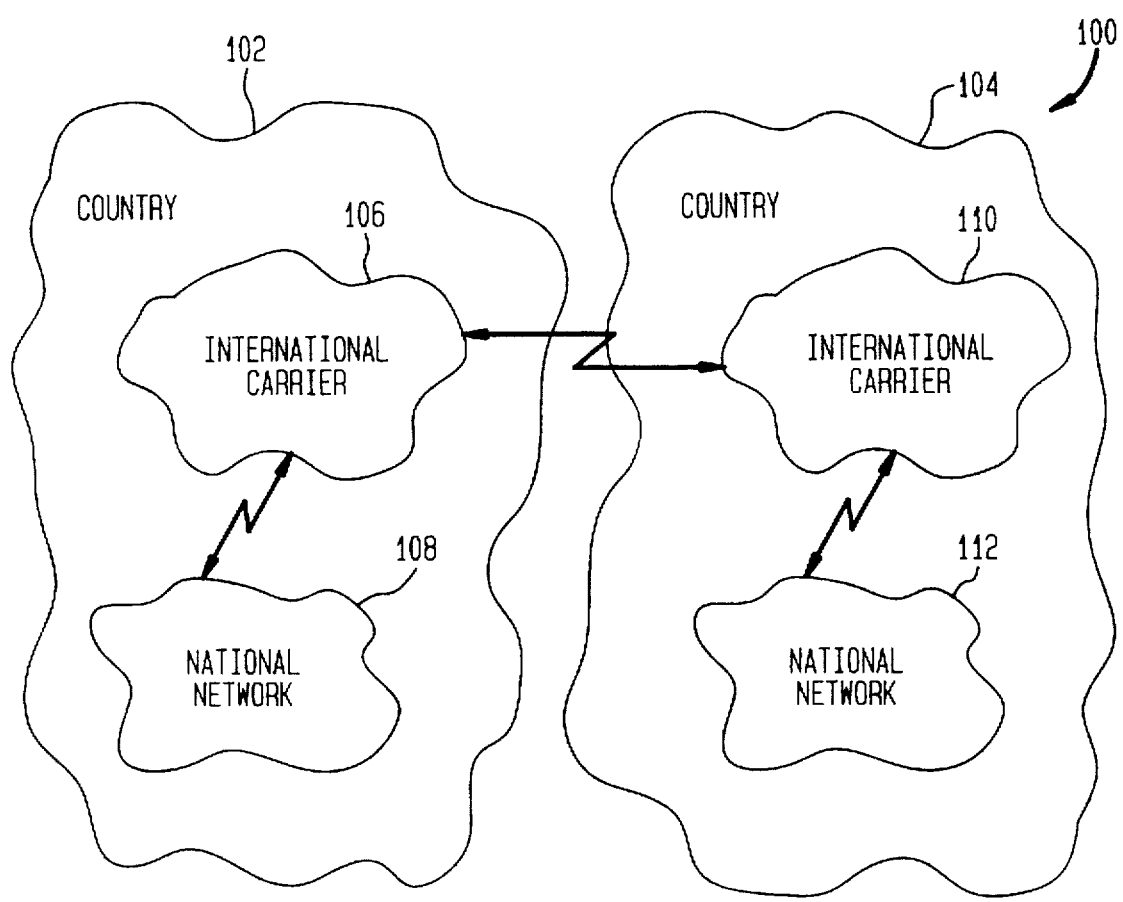
FIG. 1 is a block diagram of a telecommunications environment suitable for implementation of a preferred embodiment of the present invention.

FIG. 1 is a block diagram of a telecommunications environment 100 in which the present invention operates. The telecommunications environment 100 includes two countries, such as a country 102 and a country 104. The country 102 includes an international carrier 106 and a national network 108. The country 104 includes an international carrier 110 and a national network 112. International carrier 106 is in communication with national network 108 and international carrier 110. International carrier 110 is in communication with national network 112 and international carrier 106.

Figure 3:
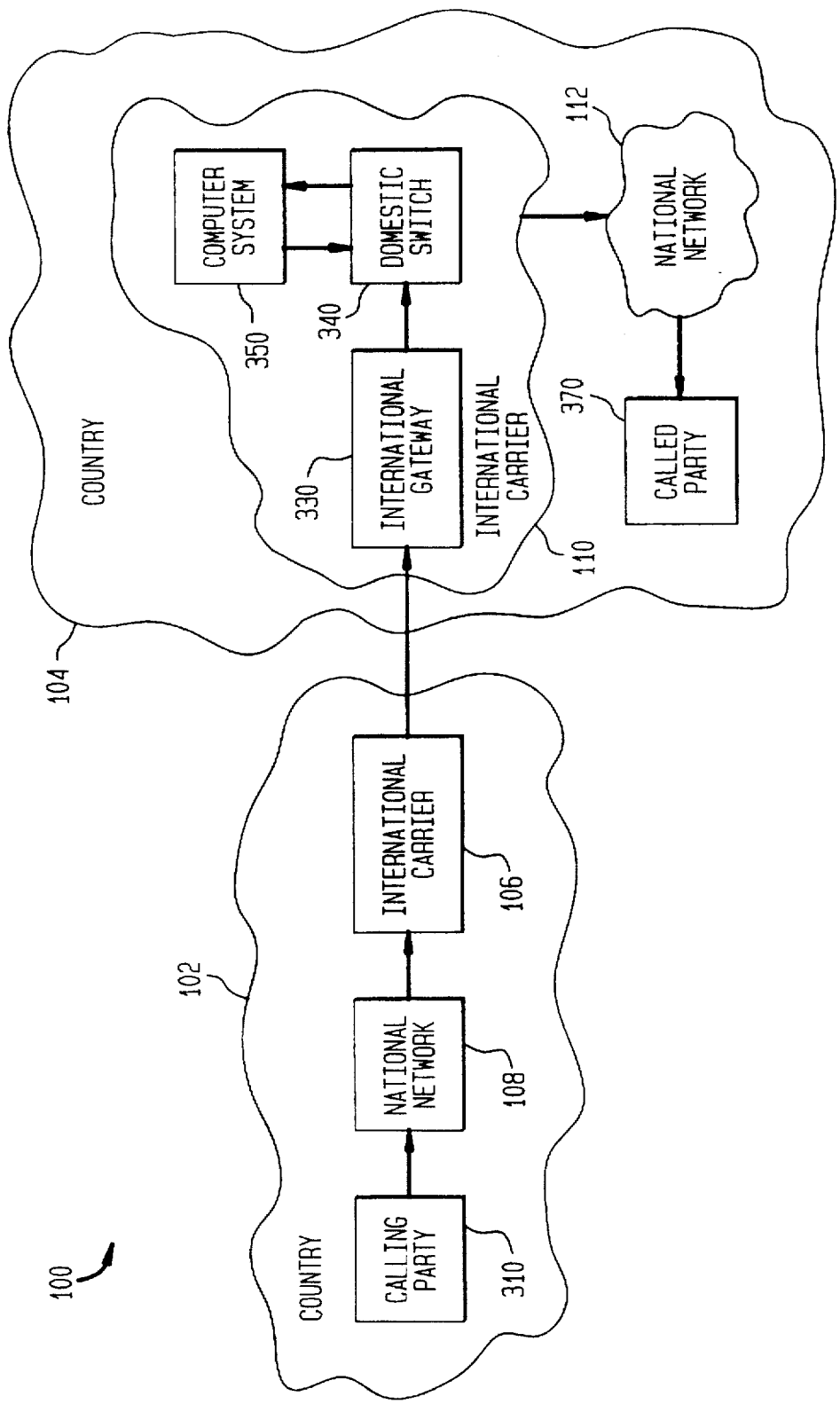
FIG. 3 is a schematic diagram of the telecommunications environment in which the present invention operates.

FIG. 3 is a more detailed block diagram of the telecommunications environment 100. The international carrier 110 functionally includes an international gateway 330 connected to the international carrier 110. In essence, the international gateway 330 serves as the interface between the international carrier 106 and the international carrier 110. The international carrier 110 also includes a plurality of switches, such as switch 340, for routing telephone calls. Each switch 340 (or some of the switches) is connected to a computer system 350, which stores telephone call routing tables.

Figure 2:
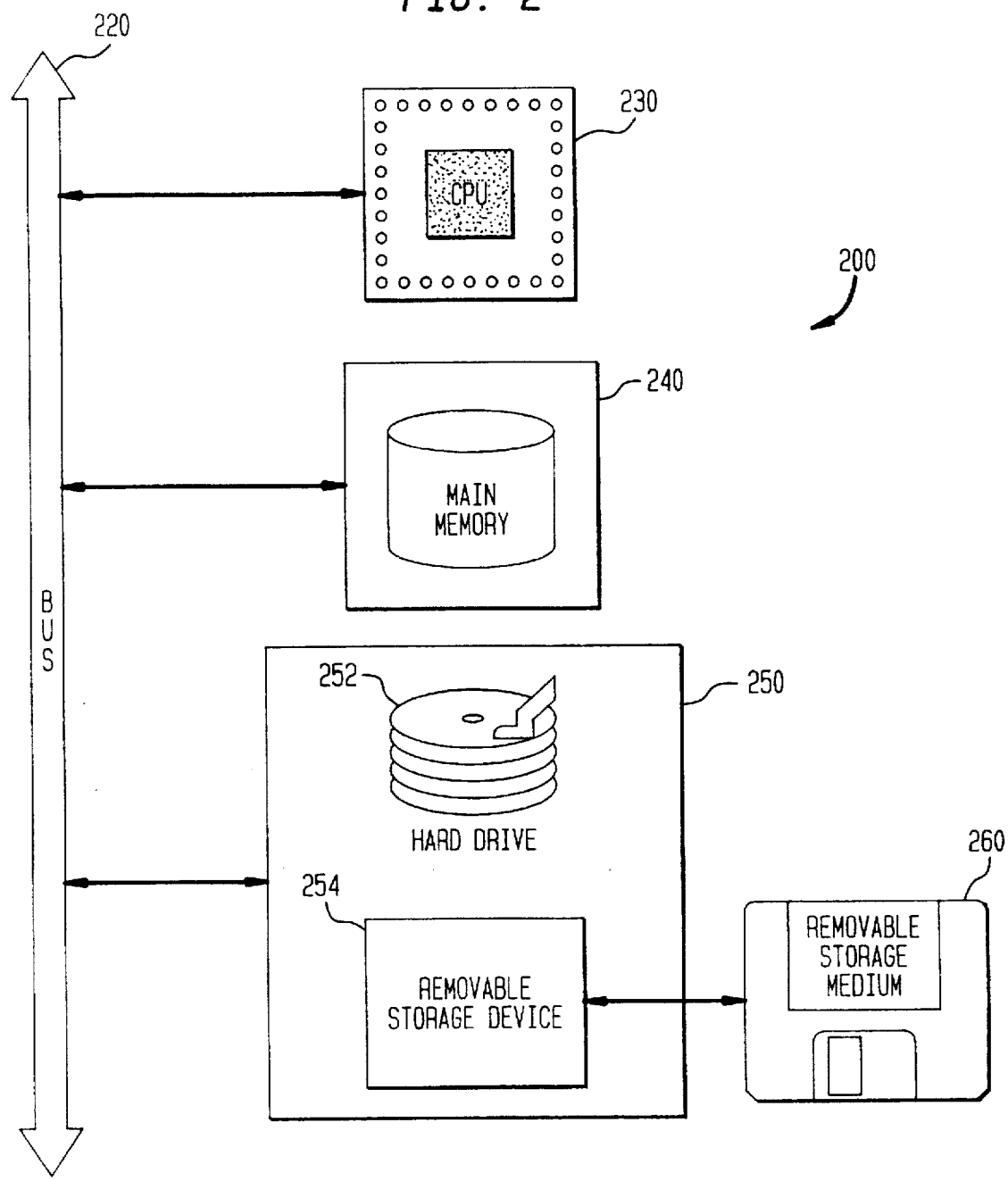
FIG. 2 is a block diagram of a computer system representing a possible implementation of many components of the present invention.

Elements of the international carrier 110, such as the switch 340, are preferably implemented using computers, such as computer system 200 as shown in FIG. 2. The computer system 200 includes a processor 230. The processor 230 communicates with other components via a communication bus 220. Connected to the bus 220 is a main memory 240 which stores control logic or software and data. During run-time, the software enables the processor 230 to perform the functions described herein. Thus, the software represents a controller of the processor 230. Although this is the preferred implementation design it is technically feasible to create the same invention with various other computer design options. For example the computer system could be resident either in the international gateway or domestic switch.

The computer system 200 also includes secondary memory 250, which may include a hard drive 252 and a removable storage device 254, such as a disk drive. A removable storage medium 260, such as a computer disk (called a computer program product), can be inserted in the removable storage device 254. Control logic and data are stored in computer readable form on a storage medium in the removable storage medium 260.

FIG. 3 illustrates a calling party 310 (also called the "caller") establishing a telephone call with a called party 370. FIG. 3 is presented in the context of an international call, but the invention is equally applicable to a domestic call (however, in this alternate embodiment, the calling party 310 would be connected to international carrier 110 in country 104).

It is assumed that the called party 370 can be reached via a public telephone number, such as a DDD telephone number or an 8XX telephone number. Thus, the calling party 310 can reach the called party 370 in a conventional manner by dialing the called party 370's public telephone number. However, this approach is not ideal because the calling party 310 may not have easy access to the called party 370's public telephone number.

In accordance with the present invention, a carrier direct telephone number (also called carrier specific telephone number) is assigned by the international carrier 110 to each public telephone number of interest. The public telephone number may be a DDD or IDDD telephone number. The public telephone number may also be an 8XX telephone number (irrespective of whether the 8XX telephone number is associated with the international carrier 110 or some other carrier). Preferably, the international carrier 110 publishes directories of its carrier direct telephone numbers. Preferably, the international carrier 110 contracts with international carrier 106 such that international carrier 106 routes all calls made using international carrier 110's carrier direct telephone numbers to international carrier 110.

Carrier direct telephone numbers are technically public telephone numbers, because they may be accessed by any member of the public via telephones connected to a public telephone network, and because they are carried over a public telephone network's public telephone lines. However, they are typically assigned by the carrier as opposed to being assigned based on the National Numbering Plan Administrator. In some instances the National Numbering Plan Administrator may also be a carrier. In order to avoid confusion, the term "public telephone numbers" does not herein refer to carrier direct telephone numbers. Instead, public telephone numbers are used herein in the conventional sense to include DDD numbers, 8XX numbers, IDDD numbers, etc.

When making a call to the called party 370, the calling party 310 can dial the called party 370's public telephone number (such as its DDD number or its 8XX number, if such numbers exists). Alternatively, the calling party 310 can dial the called party 370's private telephone number, if both the calling party 310 and the called party 370 are part of the same private or virtual private network. Alternatively, the calling party 310 can dial the called party 370's carrier direct telephone number, if one has been assigned by international carrier 110. Often, the calling party 310 will prefer to use the called party 370's carrier direct telephone number, because the called party 370's carrier direct telephone number may be more readily accessible to the calling party 310.

Suppose that the calling party 310 calls the called party 370 using the international carrier 110's carrier direct telephone number. The international carrier 106, upon receipt of the call, routes the call to international carrier 110 in accordance with the agreement between the international carrier 106 and international carrier 110. The international gateway 330 receives the call and sends the call to the switch 340.

The switch 340 has the capability to route calls having public telephone numbers. More particularly, the switch 340 has the capability to route calls having U.S. public telephone numbers. As discussed above, a U.S. public telephone number is, a ten digit number having: (1) a three-digit area code; (2) a three-digit exchange code (or central office code); and (3) a four-digit subscriber number. For example, DDD telephone calls have U.S. terminated telephone numbers. However, carrier direct telephone numbers do not represent U.S. terminated telephone numbers. Accordingly, international carrier 110's carrier direct telephone number must be translated to a public telephone number. Such translation is performed by the computer system 350. The switch 340 then routes the call in a well known manner to the called party 370.

Translation Table in the Computer System

FIG. 4 illustrates a portion of an example translation (routing) table 400 in the computer system 350. The translation table 400 includes a row for each public telephone number of interest. Rows 452, 454, 456, 458, and 460 include an input telephone number field 402 and an output (or translated) telephone number field 404. The input telephone number field 402 stores the carrier direct telephone number assigned by the international carrier 110 to the public telephone number of interest.

For example, the row 452 corresponds to Company A. As indicated in row 452, Company A's DDD telephone number is 202-888-8000. The international carrier 110 has assigned 150-123-4567 as the carrier direct telephone number for this DDD telephone number. The row 458 also corresponds to Company A. As indicated in row 458, Company A's 8XX telephone number is 800-974-6660. The international carrier 110 has assigned 150-974-6666 as the carrier direct telephone number for this 800 telephone number. According to the present invention, Company A can be reached using any one of these four telephone numbers.

Figure 5:
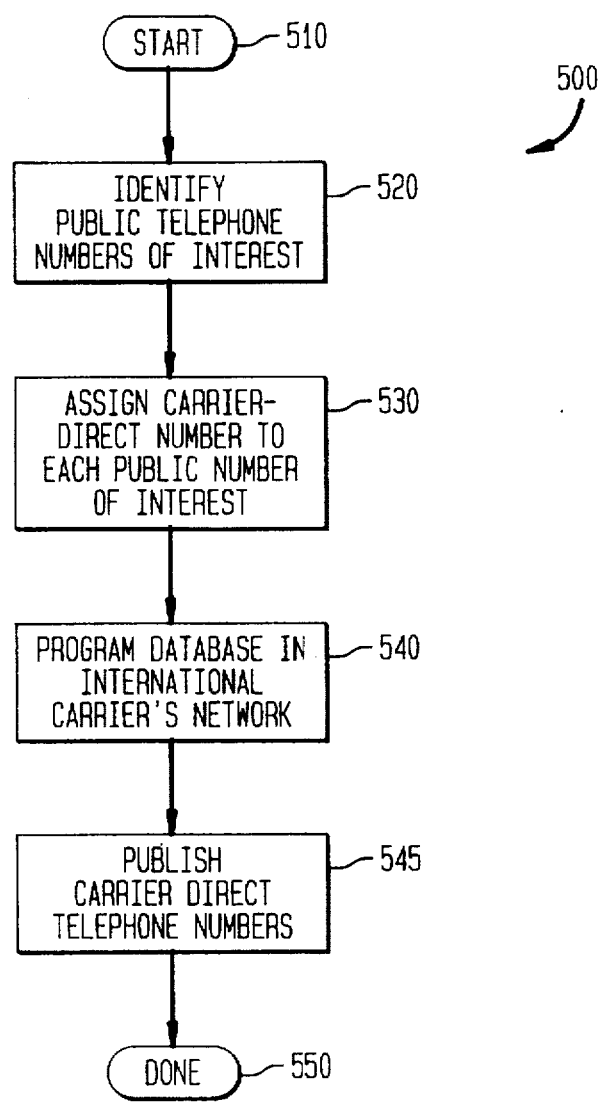
FIG. 5 is a data flow diagram illustrating the number assignment process.

Flow chart 500 in FIG. 5 represents the manner in which carrier direct telephone numbers are assigned and stored in the translation table 400 in the computer system 350. Flow chart 500 begins with step 510, where control immediately passes to step 520.

In step 520, representatives of the international carrier 110 identify public telephone numbers of interest. The public telephone numbers of interest can be directory assistance numbers, federal, state, and local government numbers, telephone numbers of popular companies, service telephone numbers (such as 1-800-MUSIC-NOW), etc.

In step 530, representatives of the international carrier 110 assign a carrier direct number to each public number of interest identified in step 520. Step 530 may be performed automatically by the international carrier 110, where a computer randomly (or using some other arbitrary procedure) assigns carrier direct numbers to the public numbers of interest.

Each carrier direct telephone number contains a carrier specific identifier which identifies the international carrier that assigned the carrier direct telephone number (in this case, the international carrier 110). Preferably, the carrier specific identifier is a three digit prefix, such as 150, for example.

In step 540, the international carrier 110 stores the public telephone numbers of interest and the corresponding carrier direct telephone numbers in the translation table 400 in the computer system 350. The international carrier 110 programs a database (not shown) located within international carrier 110.

In step 545, the international carrier 110 makes the carrier direct telephone numbers publicly available. The international carrier 110 may distribute directories (a phone book) of the carrier direct telephone numbers, for example. Such directories would list the carrier direct telephone numbers and the name of the entities/services/parties that can be reached by dialing the carrier direct telephone numbers. Operation of flow chart 500 is complete after the performance of step 545, as indicated by step 550.

Note that the carrier direct telephone numbers are not defined by a subscriber or assigned to a subscriber. Rather, the carrier direct telephone numbers are part of an open public network environment. Any member of the public with access to the directory of carrier direct telephone numbers can place a call to one of the listed numbers. Moreover, neither the calling party 310 nor the called party 370, is required to be registered (or to be a subscriber) with the international carrier 110. Thus, the general public is invited rather than excluded from utilizing the carrier direct telephone number service.

Processing of Telephone Calls

Figure 6:
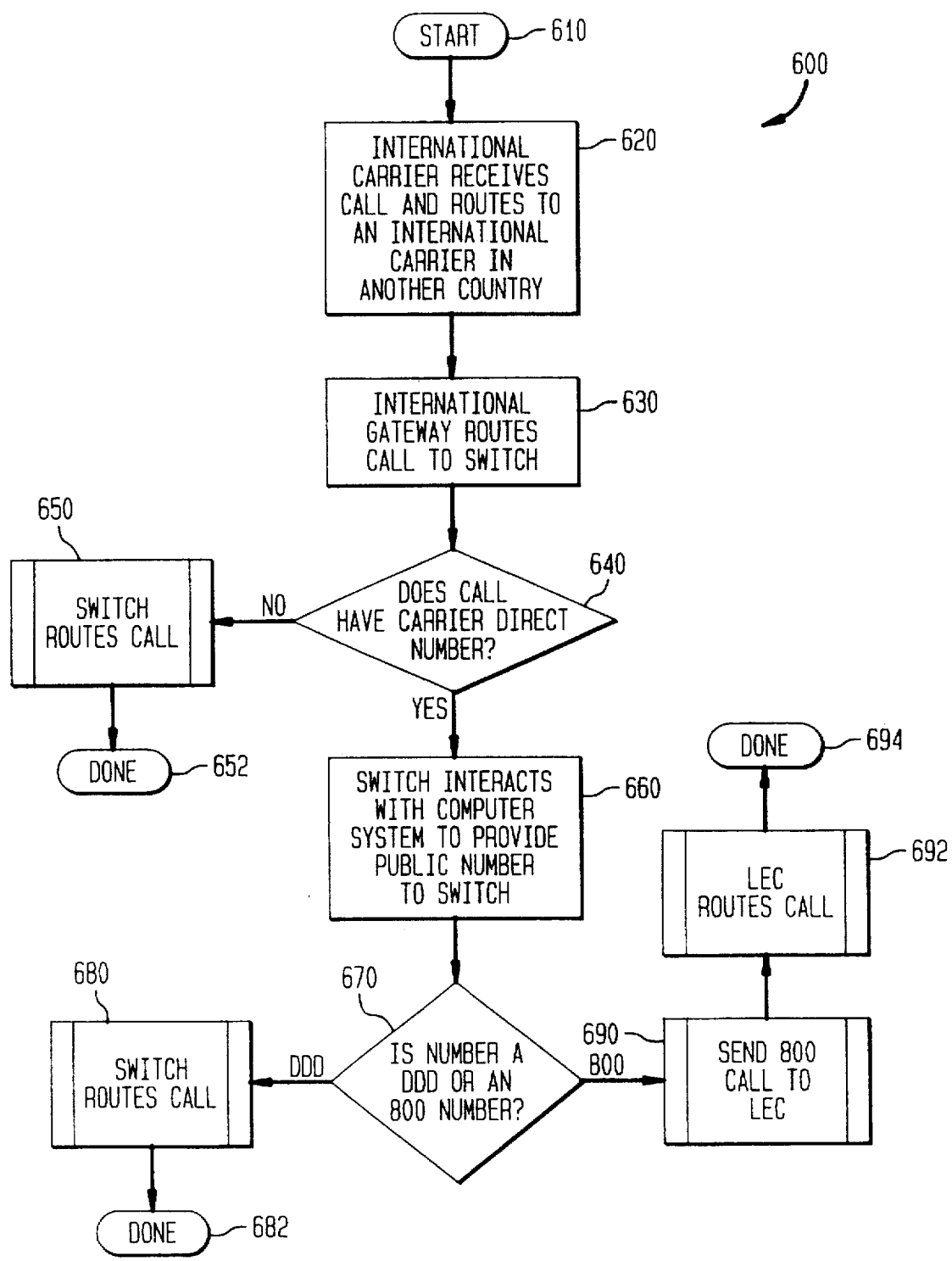
FIG. 6 is a data flow diagram illustrating the preferred operation of the present invention.

The invention processes telephone calls as illustrated by flow chart 600 of FIG. 6. Flow chart 600 begins with step 610, where control immediately passes to step 620.

In step 620, the international carrier 106 receives a call from the calling party 310. It is assumed that the calling party 310 dialed the international carrier 110's carrier direct telephone number. The international carrier 106 detects the carrier specific identifier in the carrier direct telephone number. Assume that this carrier specific identifier identifies the international carrier 110. Based on the detection of the carrier specific identifier, the international carrier 106 determines that this is a carrier direct telephone number assigned to the international carrier 110. Accordingly, the international carrier 106 routes the call to the international carrier 110.

In step 630, the international gateway 330 in the international carrier 110's network receives the call. The international gateway 330 routes the call to the switch 340 in accordance with well known telecommunication procedures.

In step 640, the switch 340 determines whether or not the call has a carrier direct telephone number. If the call does not have a carrier direct telephone number (as would be the case with DDD numbers or 800 numbers), then step 650 is performed. In step 650, the switch 340 routes the call according to well established telephone egress procedures. Operation of flow chart 600 is then complete, as indicated by step 652.

If it is determined in step 640 that the call has a carrier direct telephone number, then step 660 is performed.

In step 660, the switch 340 interacts with the computer system 350 to translate the carrier direct telephone number to a public telephone number. Specifically, the switch 340 sends the carrier direct telephone number associated with the call to the computer system 350. The computer system 350 searches its translation table 400 until it locates a row (called the matching row) where the telephone number in the input telephone number field 402 matches the carrier direct telephone number associated with the call. The computer system 350 then sends the public telephone number from the output telephone number field 404 of the matching row to the switch 340. In the example of FIG. 4, this public telephone number is either a DDD telephone number or an 800 telephone number.

In step 670, the switch 340 determines whether the public telephone number is a DDD telephone number or an 800 telephone number. If it is a DDD telephone number, then in step 680 the switch 340 routes the call using standard telephone egress procedures. Operation of flow chart 600 is then complete, as indicated by step 682.

If, instead, the switch 340 determines in step 670 that the public telephone number is an 800 telephone number, then step 690 is performed. The 800 telephone number may be associated with the international carrier 110, or may be associated with another carrier. The international carrier 110 is not capable of routing 800 calls associated with other carriers. Thus, in step 690 the switch 340 routes the call to the national network 112.

In step 692, the national network 112 routes the 800 call according to standard 800 call routing procedures within the U.S. During the performance of step 692, the national network 112 determines in a well known manner which carrier owns the 800 call (i.e., which IXC owns the 800 telephone number associated with the 8XX call). The national network 112 then routes the 800 call to that carrier, which then routes the 8XX call in accordance with standard 800 call egress procedures. Operation of flow chart 600 is then complete, as indicated by step 694.

While the invention has been particularly shown and described with reference to preferred embodiments thereof, it will be understood by those skilled in the art that various changes in form and details may be made therein without departing from the spirit and scope of the invention.

What is claimed is:

1. A method for processing telephone calls, comprising the steps of:

(a) initiating a telephone call over a public telephone line using a carrier direct telephone number having a carrier specific identifier, said carrier specific identifier identifying an international carrier;

(b) routing said telephone call to said international carrier;

(c) using said carrier direct telephone number including said carrier specific identifier as a key to translate, within said international carrier, said carrier direct telephone number to a public telephone number; and (d) routing said telephone call over public telephone lines in accordance with said public telephone number.

2. The method of claim 1, further comprising the steps of:

(e) identifying a plurality of public telephone numbers of interest;

(f) assigning carrier direct telephone numbers to said public telephone numbers of interest;

(g) generating a translation table which translates from said carrier direct telephone numbers to said public telephone numbers of interest.

3. The method of claim 2, further comprising the step of:

(h) publicly distributing said carrier direct telephone numbers.

4. A system for processing telephone calls, comprising:

means for initiating a telephone call over a public telephone line using a carrier direct telephone number having a carrier specific identifier, said carrier specific identifier identifying an international carrier;

means for routing said telephone call to said international carrier;

means for using said carrier direct telephone number including said carrier specific identifier as a key to translate, within said international carrier, said carrier direct telephone number to a public telephone number; and means for routing said telephone call over public telephone lines in accordance with said public telephone number.

5. The system of claim 4, further comprising:

means for identifying a plurality of public telephone numbers of interest;

means for assigning carrier direct telephone numbers to said public telephone numbers of interest;

means for generating a translation table which translates from said carrier direct telephone numbers to said public telephone numbers of interest.

6. The system of claim 5, further comprising:

means for publicly distributing said carrier direct telephone numbers.

* * * * *